(12) United States Patent
Caldwell et al.

(10) Patent No.: US 7,216,485 B2
(45) Date of Patent: May 15, 2007

(54) ADJUSTING AIRFLOW IN TURBINE COMPONENT BY DEPOSITING OVERLAY METALLIC COATING

(75) Inventors: James Michael Caldwell, Alexandria, KY (US); Thomas John Tomlinson, West Chester, OH (US); Robert George Zimmerman, Jr., Morrow, OH (US); Raymond William Heidorn, Fairfield, OH (US); Gilbert Farmer, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 121 days.

(21) Appl. No.: 10/934,172

(22) Filed: Sep. 3, 2004

(65) Prior Publication Data

US 2006/0059918 A1    Mar. 23, 2006

(51) Int. Cl.
*F02C 1/00* (2006.01)

(52) U.S. Cl. ............... 60/772; 60/754; 29/889.721

(58) Field of Classification Search .......... 60/752–760, 60/772; 427/421, 424, 427, 446, 455, 236; 428/13; 416/97 R, 97 A; 29/889.1, 889.721, 29/889.72, 557, 558, 527.4
See application file for complete search history.

(56) References Cited

U.S. PATENT DOCUMENTS

| | | | |
|---|---|---|---|
| 4,338,360 A | | 7/1982 | Cavanagh et al. |
| 4,743,462 A | | 5/1988 | Radzavich et al. |
| 5,724,816 A | | 3/1998 | Ritter et al. |
| 5,771,577 A | | 6/1998 | Gupta et al. |
| 5,822,853 A | | 10/1998 | Ritter et al. |
| 5,902,647 A | | 5/1999 | Venkataramani et al. |
| 5,941,686 A | * | 8/1999 | Gupta et al. ............. 415/178 |
| 6,004,620 A | | 12/1999 | Camm |
| 6,042,879 A | * | 3/2000 | Draghi et al. ............. 427/142 |
| 6,145,319 A | * | 11/2000 | Burns et al. ............. 60/755 |
| 6,171,711 B1 | * | 1/2001 | Draghi et al. ............. 428/596 |
| 6,210,488 B1 | * | 4/2001 | Bruce ............. 134/1 |
| 6,265,022 B1 | * | 7/2001 | Fernihough et al. ............. 427/142 |
| 6,339,879 B1 | | 1/2002 | Wheat et al. |
| 6,368,060 B1 | * | 4/2002 | Fehrenbach et al. ............. 416/97 R |
| 6,408,610 B1 | | 6/2002 | Caldwell et al. |
| 6,408,629 B1 | | 6/2002 | Harris et al. |
| 6,434,823 B1 | * | 8/2002 | Gupta et al. ............. 29/889.1 |
| 6,499,949 B2 | | 12/2002 | Schafrik et al. |
| 6,551,061 B2 | | 4/2003 | Darolia et al. |
| 6,573,474 B1 | * | 6/2003 | Loringer ............. 219/121.71 |

(Continued)

FOREIGN PATENT DOCUMENTS

WO    WO 99/23273    5/1999

*Primary Examiner*—William H. Rodriguez
(74) *Attorney, Agent, or Firm*—Jagtiani + Guttag; Eric W. Guttag; Ted Cummings

(57) ABSTRACT

A method for adjusting the airflow in a turbine component having a plurality of airflow holes. The method comprises the step of depositing an overlay metallic coating on the surface of the turbine component in a manner such that at least some of the airflow holes are partially filled such that the volume of the partially filled airflow holes is changed so as to adjust the airflow through the turbine component. Also provided is a turbine component having a plurality of airflow holes, at least some of the airflow holes being partially filled with the overlay metallic coating to change the volume thereof so as to adjust the airflow through the turbine component.

33 Claims, 6 Drawing Sheets

U.S. PATENT DOCUMENTS

| | | |
|---|---|---|
| 6,620,457 B2 | 9/2003 | Farmer et al. |
| 6,623,790 B2 * | 9/2003 | Fernihough et al. ........ 427/140 |
| 6,655,149 B2 | 12/2003 | Farmer et al. |
| 6,663,919 B2 | 12/2003 | Farmer et al. |
| 6,723,951 B1 | 4/2004 | McGraw |
| 6,749,396 B2 * | 6/2004 | Barry et al. ................ 415/115 |
| 6,847,004 B2 * | 1/2005 | Das et al. ............... 219/121.71 |
| 6,908,657 B2 * | 6/2005 | Farmer et al. .............. 428/131 |
| 2001/0001680 A1 | 5/2001 | Farmer et al. |
| 2003/0010035 A1 | 1/2003 | Farmer et al. |
| 2003/0037436 A1 * | 2/2003 | Ducotey et al. ........... 29/889.1 |
| 2005/0220618 A1 * | 10/2005 | Zhang et al. ............. 416/97 R |

* cited by examiner

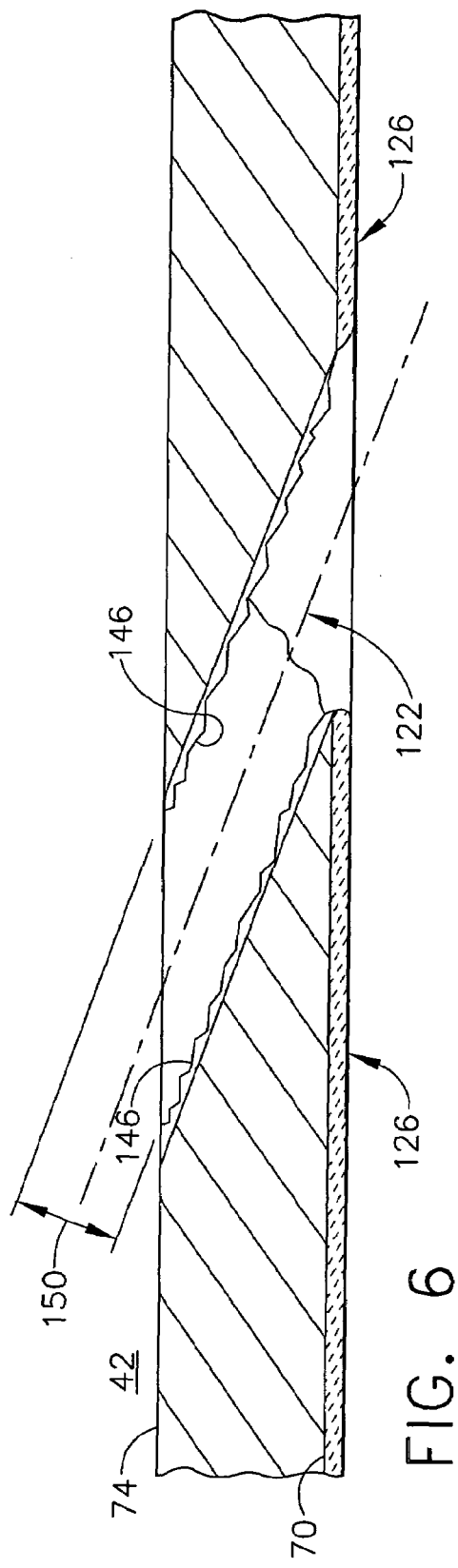
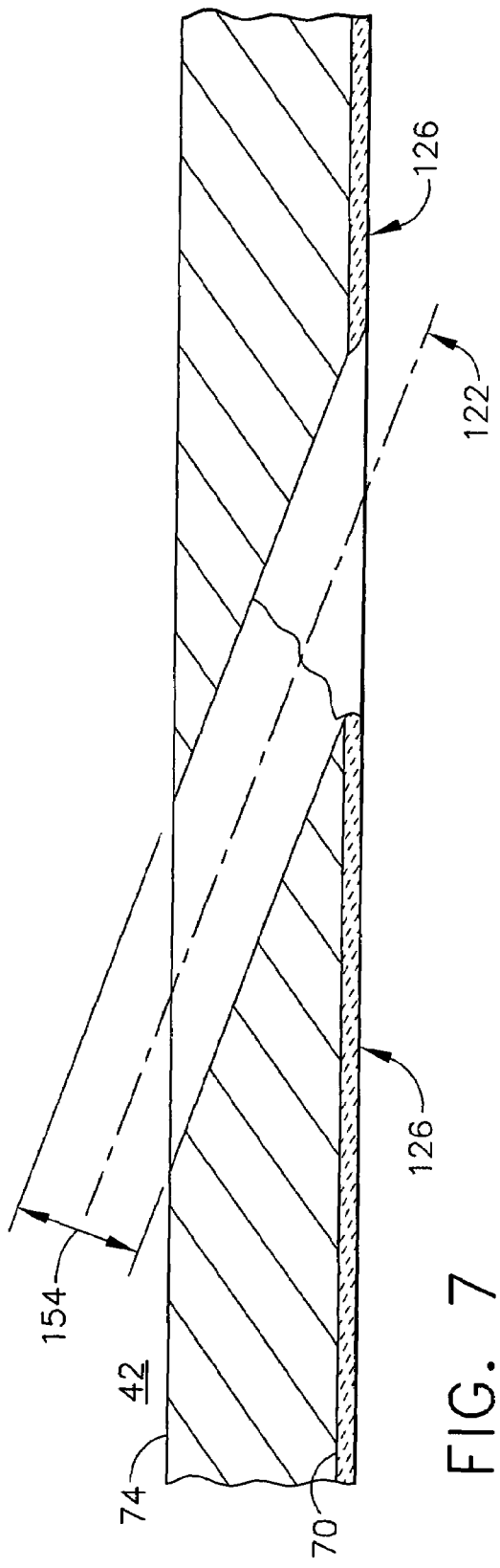

ADJUSTING AIRFLOW IN TURBINE COMPONENT BY DEPOSITING OVERLAY METALLIC COATING

BACKGROUND OF THE INVENTION

This invention relates to adjusting the airflow in turbine components, e.g., gas turbine components, having airflow holes by depositing an overlay metallic coating. This invention further relates to the turbine component whose airflow has been adjusted by depositing such an overlay metallic coating.

Airflow holes are formed in many gas turbine components, such as combustor liners, for transporting film air through the component to typically cool the component and to form a fluid barrier between the component and hot gases traveling in the main flowpath of the engine. In addition to flowing air over the hot surfaces, combustor liner cooling is also provided by a thin layer of cooling air along the inner, combustion side of the liner by directing airflow through an array of very small airflow holes formed in the liner, typically having a diameter of from about 0.02 to about 0.03 inches (from about 508 to about 762 microns). This film cooling is also induced through "nugget" holes that are typically in one row along the forward edge of the liner, and a much greater number of "transpiration" holes that are typically arranged in a plurality of rows across the entire surface of the liner to induce a more uniform airflow. These "transpiration" holes are typically angled or slanted from the "cold" or air supply side, to the "hot" or combustion side of the liner in a downstream direction, and typically have a circumferential orientation. See, for example, FIG. 2 of commonly assigned U.S. Pat. No. 6,655,149 (Farmer et al), issued Dec. 2, 2003. This arrangement, commonly referred to as "multi-hole film cooling," reduces the overall liner cooling airflow requirement because the mass flow through the airflow holes dilutes the hot combustion gas next to the liner surface, with the flow through the airflow holes providing convective cooling of the liner walls. In addition to these smaller diameter "nugget" and "transpiration" airflow holes, larger diameter holes (commonly referred to as "dilution holes") to introduce dilution air into the combustion zone are also provided at spaced intervals. See, for example, commonly assigned FIG. 2 of U.S. Pat. No. 6,408,629 (Harris et al), issued Jun. 25, 2002 and FIG. 3 of U.S. Pat. No. 6,655,149 (Farmer et al), issued Dec. 2, 2003.

The combustion side of these combustion liners can be coated with a thermal barrier coating to help protect the liner from thermal fatigue caused by the hot gas radiation and conduction to the combustor liner or liners. See commonly assigned U.S. Pat. No. 6,620,457 (Farmer et al), issued Sep. 16, 2003, which discloses a physical vapor deposition process to thermally insulate the combustor liner. After a period of service, these combustor liners are typically removed from the engine for replacement, repair, cleaning and/or removal of contaminants (e.g., oxidative deposits and residual combustion products), cracking and other thermally induced stresses that the liners have been subjected to. At least some of these cracks run through the various holes, including the smaller "nugget" and "transpiration" holes.

To repair a part or component, or a portion of a part or component, adequate cleaning of the surface thereof is typically required. During cleaning, the thermal barrier coating and contaminants are typically removed from the combustor liners by chemical and/or mechanical processes, for example, a conventional acid strip process. Repair of the combustor liners, and in particular repair of the cracks that typically form in the liners during operation and use, can cause at least some of the very small "nugget" and "transpiration" holes to become obstructed, occluded, plugged, or otherwise blocked which can then require chemical and/or mechanical processes to reopen the holes. The reopening of these airflow holes, as well as the chemical stripping process that removes the coatings and contaminants, can also remove some of metal substrate of the combustor liner where these holes are located, resulting in enlarging of these holes. These enlarged airflow holes can significantly and undesirably increase the airflow of these liners. Indeed, after several cycles of such cleaning and repair, the airflow can be increased to the extent that the combustor liner is no longer usable.

Problems in controlling airflow can also occur during the original manufacture of the combustor liners. To form typically thousands of these very small "nugget" and "transpiration" holes, and especially at a slanted angle, the liner is typically drilled using special machining processes such as laser beam or electrical discharge machining (EDM) processes. While a certain amount of control can be exercised over the pattern and size of the drilled holes, it is still extremely difficult to provide combustor liners that have a consistent pattern and size of holes such that the airflow rate is within desired limits. In addition, laser or EDM drilling forms a recast layer along the surface of the hole as it is generated. During subsequent stripping and cleaning of the combustor liner, this recast layer can also be removed, thus enlarging the hole and increasing the airflow.

A method for adjusting airflow in a turbine component having such airflow holes is disclosed in commonly assigned U.S. Pat. No. 6,408,610 (Caldwell et al), issued Jun. 25, 2002. This method involves depositing a thermal barrier coating by a physical vapor deposition (PVD) process (e.g., electron beam PVD) on the exterior and/or interior surfaces of the component to at least partially obstruct the airflow through the airflow holes. While this method provides the ability to adjust the airflow through the airflow holes, the physical vapor deposition apparatus, because of its size, may not provide the flexibility needed to use it with some turbine components. In addition, thermal barrier coatings typically comprise ceramic materials that may or may not adhere adequately to the metal surface of the liner over time without an overlay metallic bond coat layer. See U.S. Pat. No. 6,620,457, supra, which discloses spraying NiCrAlY as a bond coat layer 110 of from about 4 to about 10 mils on the inner combustion surface 40 of the combustor liner 14 before depositing the thermal barrier coating 120.

Accordingly, it would be desirable to be able to economically and evenly adjust the airflow in turbine components (e.g., gas turbine components), such as combustor liners, having a large quantity of smaller diameter airflow holes where the air volume of the respective holes has been changed, and especially enlarged, during subsequent repair, replacement, cleaning, and/or removal processes. It would also be desirable to be able to adjust the airflow through turbine components after final manufacture without removing, or substantially removing, previously applied thermal barrier coatings. It would additionally be desirable to be able to adjust the airflow in turbine components, such as combustor liners, having airflow holes that, when originally manufactured (i.e., an OEM component), require airflow adjustment to be within acceptable limits. It would be further desirable to be able to have the flexibility to adjust the airflow in a variety of turbine components having airflow holes and especially a component having many thousands of airflow holes as, for example, a combustor liner.

BRIEF DESCRIPTION OF THE INVENTION

An embodiment of this invention relates to a method for adjusting the airflow in a turbine component (e.g., a gas turbine component) having a plurality of airflow holes. This method comprises the step of depositing an overlay metallic coating on the surface of the turbine component in a manner such that at least some of the airflow holes are partially filled such that the volume of the partially filled airflow holes is changed so as to adjust the airflow through the turbine component.

Another embodiment of this invention relates to a turbine component having a plurality of airflow holes, at least some of the airflow holes being partially filled with the overlay metallic coating to change the volume thereof so as to adjust the airflow through the turbine component.

The method and turbine component of this invention provides a number of benefits and advantages. These include but are not limited to: (1) providing the ability to repair or correct the airflow in turbine components, such as combustor liners, having a plurality of airflow holes so as to come within desired airflow specification or limits; (2) providing the ability to locally correct or change the airflow within specific regions or areas having such airflow holes as needed or desired, including controlling such airflow within desired specifications or limits; (3) recovering and repairing previously used or operational combustor liners and other turbine components having a plurality of airflow holes in a cost effective and efficient manner; (4) performing such recovery or repair of the turbine component without having to remove original or restored thermal barrier coatings or otherwise undesirably altering the physical or chemical properties, or physical dimensions of the component; and (5) recovering or salvaging turbine components manufactured with airflow greater than desired operational specifications or limits.

BRIEF DESCRIPTION OF THE DRAWINGS

FIG. 6 is a view similar to that of FIG. 5 showing the recast layer formed by either laser or EDM drilling of a slanted transpiration cooling hole.

FIG. 7 is a view similar to that of FIG. 6 showing the recast layer removed from the transpiration cooling hole.

DETAILED DESCRIPTION OF THE INVENTION

Figure 1:
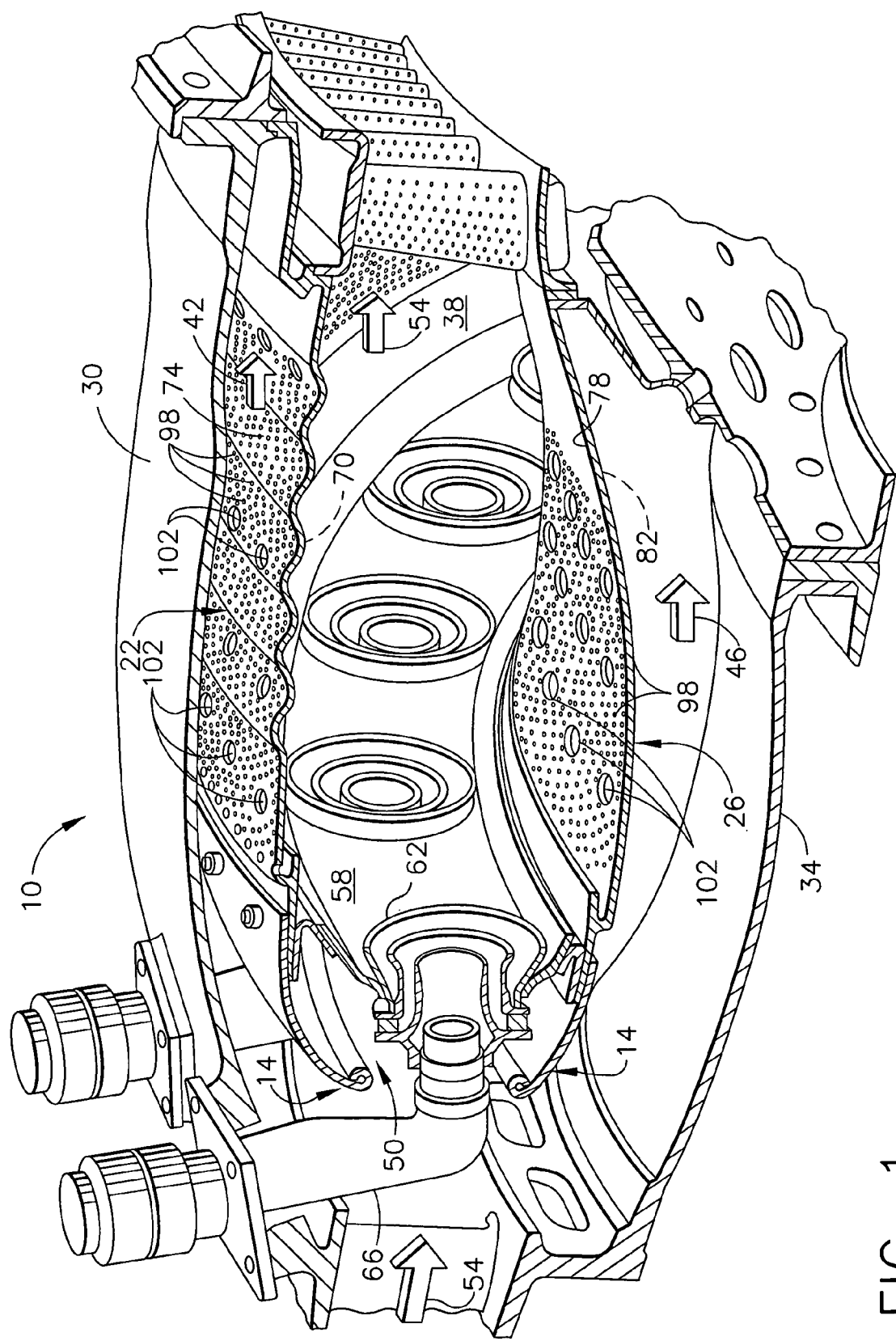
FIG. 1 is a cutaway perspective view of a representative gas turbine combustor having combustor liners for which the method of this invention is useful.

As used herein, the term "turbine component having a plurality of airflow holes" refers to any turbine engine component (e.g., gas turbine engine component) having at least two and typically a multiplicity of airflow holes through which air is circulated, typically for the purpose of cooling the component. Representative examples of such turbine components include but are not limited to turbine shrouds, such as, for example, those disclosed in commonly assigned U.S. Pat. No. 5,127,793 (Walker et al), issued Jul. 7, 1992; U.S. Pat. No. 5,169,287 (Proctor et al), issued Dec. 8, 1992; U.S. Pat. No. 6,340,285 (Gonyou et al), issued Jan. 22, 2002); and U.S. Pat. No. 6,354,795 (White et al), issued Mar. 12, 2002, all of which are incorporated by reference; combustor liners, such as, for example, those disclosed in commonly assigned U.S. Pat. No. 6,408,629 (Harris et al), issued Jun. 25, 2002; U.S. Pat. No. 6,655,149 (Farmer et al), issued Dec. 2, 2003; and U.S. Pat. No. 6,620,457 (Farmer et al), issued Sep. 16, 2003, all of which are incorporated by reference, heat shields, vanes, impingement rings, nozzles, etc. This invention is particularly directed at combustor liners and other turbine components having a plurality, or more typically a multiplicity, of such airflow holes, and more particularly combustor liners having a plurality, or more typically a multiplicity, of transpiration cooling airflow holes to provide what is commonly referred to as "multi-hole film cooling." See, for example, U.S. Pat. No. 6,408,629, supra; U.S. Pat. No. 6,655,149, supra; and U.S. Pat. No. 6,620,457, supra, all of which are incorporated by reference.

As used herein, the term "airflow hole(s)" refers to holes through which air passes or otherwise circulates to adjust, change or otherwise control the airflow in the turbine component, and which typically provide or induce, directly or indirectly, cooling of the turbine components, i.e., are cooling holes, such as nugget holes or transpiration holes.

As used herein, the term "overlay metallic coating" refers to any metallic coating that can be sprayed, applied or otherwise deposited by thermal spray deposition techniques and are often used to deposit additive metallic coatings on a metal substrate before thermal barrier coating materials are deposited. These overlay metallic coatings include MCrAlY coatings wherein M is a metal such as iron, nickel, platinum, cobalt or alloys thereof, etc. Typically, the overlay metallic coating used in this invention is a NiCrAlY coating.

As used herein, the term "thermal spray deposition methods" refers to any method for spraying, applying or otherwise depositing the overlay metallic coating that involves heating and typically at least partial or complete thermal melting of the overlay coating material and depositing of the heated/melted material, typically by entrainment in a heated gas stream, onto the metal substrate to be coated. Suitable thermal spray deposition techniques include plasma spray, such as air plasma spray (APS) and vacuum plasma spray (VPS), high velocity oxy-fuel (HVOF) spray, detonation spray, wire spray, etc., as well as combinations of these techniques. A particularly suitable thermal spray deposition technique for use herein is plasma spray. Suitable plasma spray techniques are well known to those skilled in the art. See, for example, Kirk-Othmer Encyclopedia of Chemical Technology, 3rd Ed., Vol. 15, page 255, and references noted therein, as well as U.S. Pat. No. 5,332,598 (Kawasaki et al), issued Jul. 26, 1994; U.S. Pat. No. 5,047,612 (Savkar et al) issued Sep. 10, 1991; and U.S. Pat. No. 4,741,286 (Itoh et al), issued May 3, 1998 (herein incorporated by reference) which are instructive in regard to various aspects of plasma spraying suitable for use herein. In general, typical plasma spray techniques involve the formation of a high-temperature plasma, which produces a thermal plume. The overlay metallic coating material, e.g., as a powder, is fed into the plume, and the plume is directed toward the base metal substrate to be coated. Various details of such plasma spray coating techniques are also well-known to those skilled in the art, including various relevant steps and process parameters such as cleaning of the surface of the base metal substrate prior to deposition, plasma spray parameters such as spray distances (gun-to-substrate), selection of the number of spray-passes, powder feed rates, particle velocity, torch power, plasma gas selection, oxidation control to adjust oxide stoichiometry, angle-of-deposition, post-treatment of the applied coating, and the like. Suitable plasma spray systems are described in, for example, U.S. Pat. No. 5,047,612 (Savkar et al), supra, which is incorporated by reference.

As used herein, the term "comprising" means various compositions, components, materials, layers, steps, etc., can be conjointly employed in this invention. Accordingly, the term "comprising" encompasses the more restrictive terms "consisting essentially of" and "consisting of."

All amounts, parts, ratios and percentages used herein are by weight unless otherwise specified.

The various embodiments of the method and turbine component of this invention are further illustrated by reference to the drawings as described hereafter. Referring to the drawings, FIG. 1 shows a gas turbine engine combustor indicated generally as 10 which comprises at least one component having a plurality, and more typically a multiplicity, of airflow holes for which the method of this invention is useful. As shown in FIG. 1, combustor 10 includes a cowl assembly indicated as 14, an outer combustor liner indicated as 22 and an inner combustor liner indicated generally as 26. The outer and inner liners 22 and 26 are disposed between an outer combustor casing 30 and an inner combustor casing 34. Outer and inner liners 22 and 26 are generally annular in form about a centerline axis (not shown) and are radially spaced from each other to define a combustion chamber 38 therebetween. The outer liner 22 and the outer casing 30 form an outer passage therebetween indicated by arrow 42, while inner liner assembly 26 and the inner casing 34 form an inner passage therebetween indicated by arrow 46.

Figure 2:
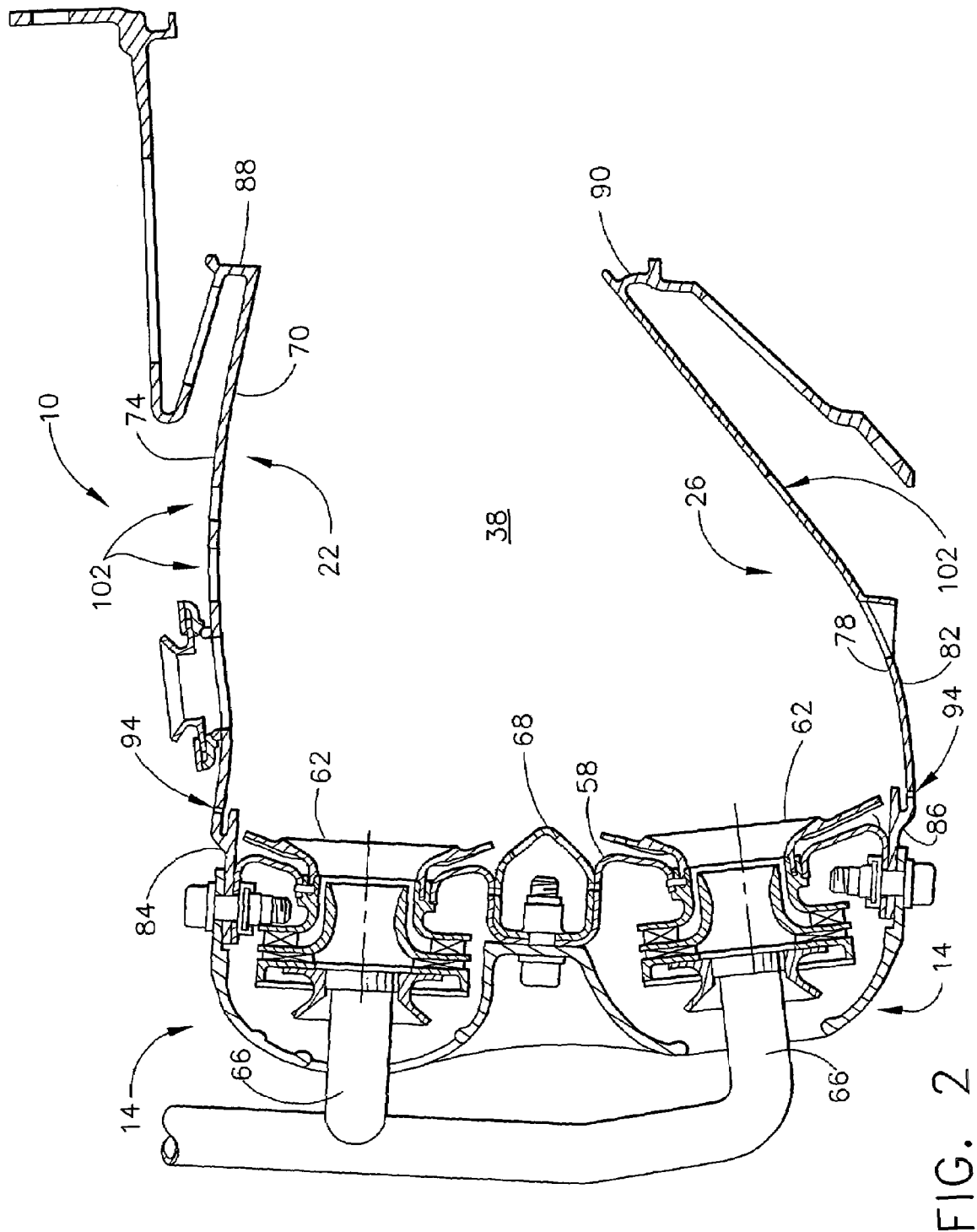
FIG. 2 is an enlarged sectional view of a double annular combustor having combustor liners for which the method of this invention is useful.

Cowl assembly 14 is mounted to the upstream ends of outer and inner liners 22 and 26. An annular opening 50 is formed in the cowl assembly 14 for the introduction of compressed air into combustor 10. The compressed air is supplied from a compressor (not shown) and is channeled in a direction generally indicated by arrows 54 of FIG. 1. The compressed air passes principally through the opening 50 to support combustion and partially into the outer and inner passages 42 and 46 where it is used to at least partially provide cooling airflow for outer and inner liners 22 and 26. Disposed between and interconnecting liners 22 and 26 near their respective upstream ends is an annular dome plate 58. A plurality of circumferentially spaced swirler assemblies 62 are mounted in the dome plate 58. Each swirler assembly 62 receives compressed air from the opening 50 and fuel from a corresponding fuel tube 66. The fuel and air are swirled and mixed by swirler assemblies 62, and the resulting fuel/air mixture is discharged into the combustion chamber 38. It should be noted that although FIG. 1 illustrates a single annular combustor, the method of this invention is equally applicable to any type of combustor, including double and triple annular combustors, that use liners with multi-hole film cooling. One such representative double annular combustor is shown in FIG. 2 as having two rows of swirler assemblies 62 and corresponding fuel tubes 66, as well as a centershield 68.

The outer and inner liners 22 and 26 each comprise a single wall, metal shell having a generally annular and axially extending configuration. As shown in FIGS. 1 and 2, outer liner 22 has a hot or combustion surface or side 70 facing the hot combustion gases in the combustion chamber 38 and a cold or air supply surface or side 74 in contact with the relatively cooler air in outer passage 42. Similarly, the inner liner 26 has a hot or combustion surface or side 78 facing the hot combustion gases in the combustion chamber 38 and a cold or air supply surface or side 82 in contact with the relatively cooler air in inner passage 46. As shown particularly in FIG. 2, each of liners 22 and 26 also has respective forward bands indicated generally as 84 and 86, as well as aft leaf seal lips indicated generally 88 and 90, for securing liners 22 and 26 within combustor 10.

Figure 3:
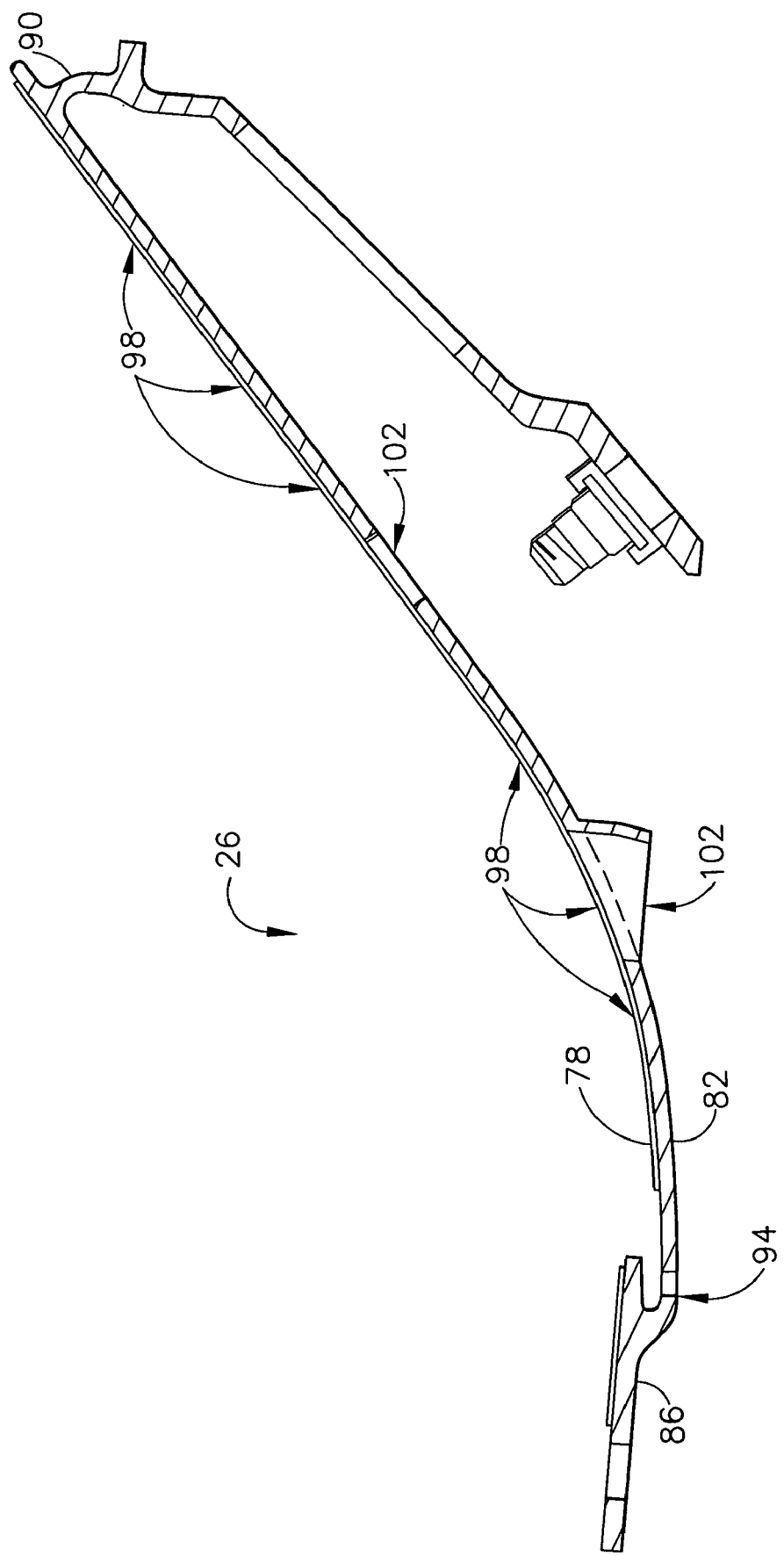
FIG. 3 is an enlarged sectional view of the inner combustor liner shown in FIG. 2.

As shown in FIG. 1, both outer and inner liners 22 and 26 have formed therein a large number of airflow holes. Referring to FIG. 3 which shows, for illustrative purposes, inner liner 26 having a row of relatively small nugget cooling holes indicated generally as 94 at the forward end of the liner, several arranged arrays comprising a plurality of rows of smaller transpiration cooling holes indicated generally as 98, and at least one row of larger dilution holes indicated generally as 102 that extend from the cold side 82 (or 74 in the case of outer liner 22) to the hot side 78 (or 70 in the case of outer liner 22). Dilution holes 102 introduce air into combustor chamber 38, are generally far smaller in number than nugget holes 94, and especially transpiration holes 98, and have a cross-sectional area that is substantially greater than the cross-sectional area of holes 94 and 98. The transpiration holes 98 are typically axially slanted from the cold side 74, 82 to the respective hot side 70, 78 in the downstream direction. Thus, air from the outer and inner passages 42 and 46 passing through the nugget and transpiration holes 94 and 98 is directed downstream so as to form a cooling film on the hot side 70, 78 of each liner 22 and 26.

Figure 4:
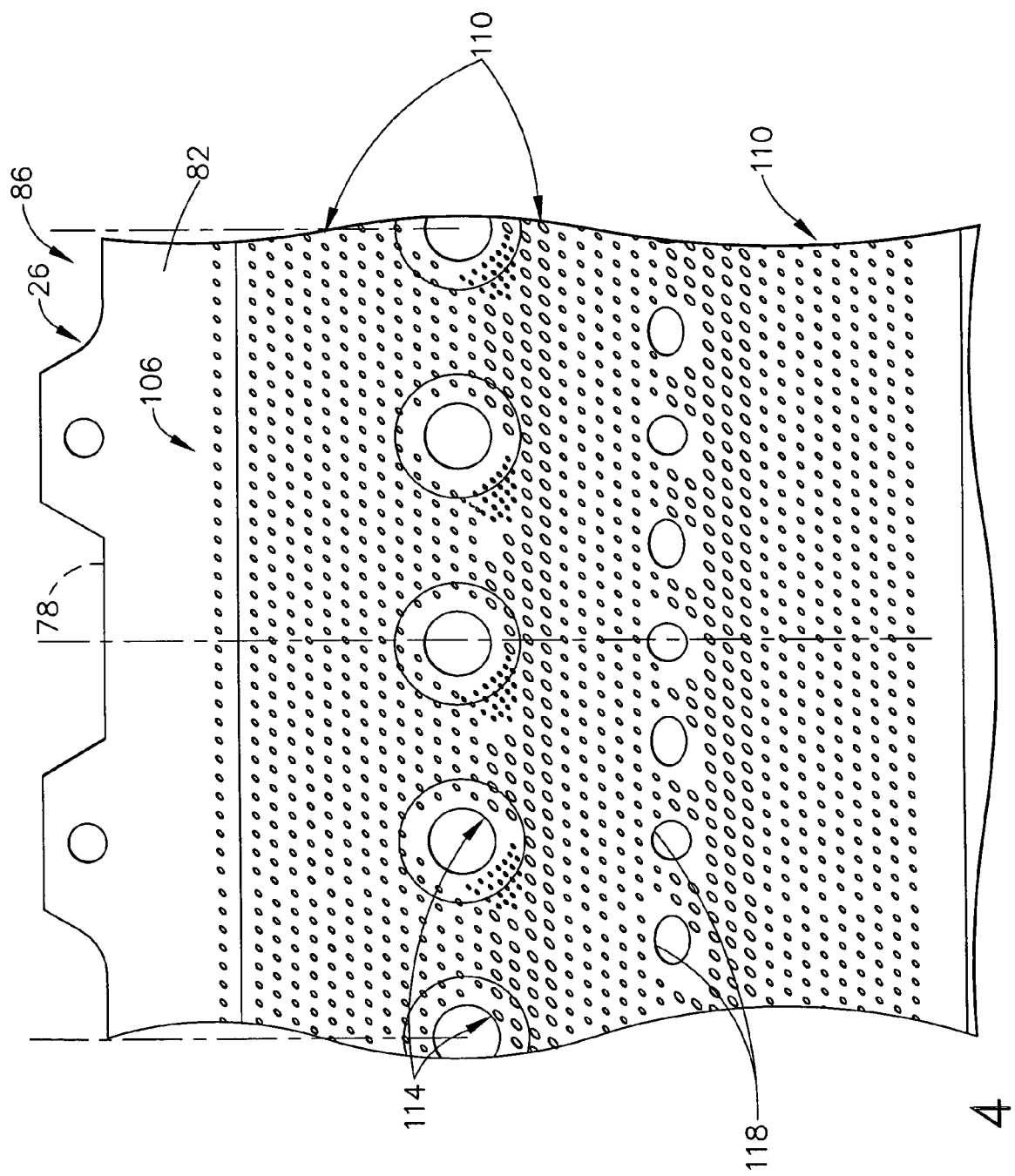
FIG. 4 is an enlarged fragmentary view of the outer surface of the combustor liner of FIG. 3 showing a representative arrangement of airflow holes.

Referring to FIG. 4, and viewed from the hot or combustion side 78, a representative arrangement of nugget holes 94, transpiration holes 98 and dilution holes 102 is shown for inner liner 26. As shown in FIG. 4, and proceeding from the upstream end to the downstream end of liner 26, a circumferentially extending row indicated as 106 of nugget holes 94 is formed at the upstream end of the liner, with many circumferentially extending rows of laterally spaced transpiration holes 98 indicated generally as 110 being formed and arrayed after nugget hole row 106. The nugget holes 94 in row 106 and the transpiration holes 98 in rows 110 typically have a diameter of from about 0.01 to about 0.05 inches (from about 254 to about 1270 microns), more typically from about 0.02 to about 0.03 inches (from about 508 to about 762 microns), and a spacing therebetween of from about 3 to about 10 hole diameters.

As also shown in FIG. 4, a circumferentially extending row indicated as 114 of primary dilution holes 102 is located towards the upstream end of liner 26, with a circumferentially extending row indicated as 118 of secondary dilution holes located downstream of the primary dilution holes. Primary dilution holes 114 and secondary dilution holes 118 typically have a diameter of from about 0.1 to about 0.75 inches (from about 2.5 to about 19 mm.), with the primary dilution holes 114 typically being larger in diameter than the secondary dilution holes 118. Depending upon the diameter and spacing, there are typically from about 20 to about 60 primary dilution holes 114 and from about 20 to about 120 secondary dilution holes 118 formed in the liner.

Figure 5:
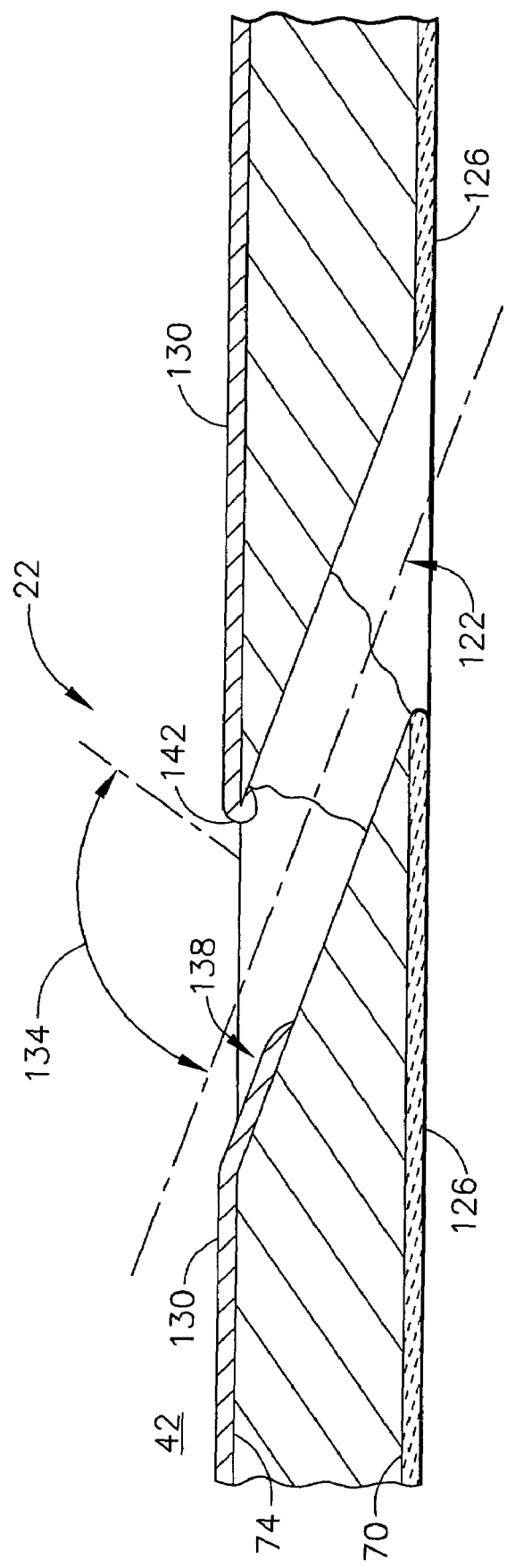
FIG. 5 is an enlarged sectional view of the outer combustor liner showing a coating applied by the method of this invention.

Referring to FIG. 5, a cross-section of one such transpiration cooling hole formed in outer liner 22 that is indicated as 122, and extends at a slanted angle downwardly towards the downstream end from cold side 74 to hot side 70 of liner 22. (The cross-section for such a transpiration cooling hole formed in inner liner 26 would be similar, i.e., extending at a slanted angle upwardly towards the downstream end from cold side 82 to hot side 78 of liner 26.) As shown in FIG. 5, hot side 70 typically has formed thereon an additive thermal barrier coating (TBC) indicated generally as 126. To adjust the airflow through hole 122, an overlay metallic coating indicated as 130 is deposited (e.g., sprayed) by an apparatus (not shown) using thermal spray deposition techniques on the cold or air supply side 70. The particular spray angle indicated as 134 for depositing coating 130 can depend on a variety of factors, including the slanted angle of hole 122, etc. For example, and as shown in FIG. 5, the spray angle 134 for depositing coating 130 can be the same or similar to that of the slanted angle of hole 122, or can be different from that of the slanted angle of hole 122.

Coating 130 can be deposited to any desired thickness, but is typically deposited to a thickness in the range of from about 1 to about 10 mils (from about 25 to about 254 microns), more typically from about 2 to about 7 mils (from about 51 to about 178 microns), i.e., is relatively thin. Depending upon the spray angle 134 at which the overlay metallic coating is deposited, a portion of coating 130 enters hole 122 at the cold side 74 end thereof, and partially fills hole 122, as indicated by 138. Because the lip end 142 of hole 122 is partially filled with the portion 138 of coating 130, this effectively reduces the diameter of hole 122, and thus partially obstructs or restricts the effective area or volume of hole 122, thus reducing the volume of airflow that can enter such holes 122 from passage 42 (or from passage 46 adjacent to liner 26) for a given pressure drop. As a result, the airflow from passage 42 (or 46 adjacent to liner 26) into holes 122 is reduced. The coating 130 can be applied in such a manner so as to restrict the airflow through a larger or smaller quantity or number of holes 122, so as to restrict the airflow through a specified, defined or otherwise selected pattern (e.g., row(s), array(s), area(s), etc.) of holes 122, etc., or any combination thereof. In this manner, the airflow of liner 22 (or 26) can be controlled and adjusted within desired limits or specifications depending upon the number of holes 122 that are partially filled with the portion 138 of coating 130, the pattern of such holes 122 that are filled with the portion 138 of coating 130, and/or the degree to which holes 122 are partially filled with the portion 138 of coating 130.

In gas turbine components such as liners 22 and 26, airflow hole sizes and airflow passage areas are typically controlled tightly with regard to both upper and lower airflow limits or specifications. In the combustion chamber 38, insufficient cooling airflow or area could result in reduced component durability. In addition, excessive cooling airflow or area could result in detrimental effect on engine performance, operability and ignition. This condition is usually the result of at least some of the airflow holes 122 being larger than desired. This can occur as a result of two factors: (1) holes 122 being larger than the specified or desired size or diameter after original manufacture of the turbine component (i.e., an OEM component) such that desired airflow specifications or limits are exceeded; or (2) holes 122 becoming enlarged after original manufacture and during operation of the turbine component such that desired airflow specifications or limits are exceeded. The various embodiments of the method of this invention are intended to be applicable to turbine components (e.g., combustor liners 22 and 26) that have larger than desired holes 122 due to either of factors 1 or 2.

The diameter of holes 122 can become enlarged (i.e., factor 2) for a variety of reasons, thus increasing the airflow through outer and inner liners 22 and 26. For example, enlargement of holes 122 can result from the various processes that are used to perform repairs on outer and inner liners 22 and 26, as well as the manner in which holes 122 are formed. This is exemplified by FIGS. 6 and 7. FIG. 6 shows a hole 122 formed by a special machining process, such as laser or electrical discharge machine (EDM) drilling. As a result of laser or EDM drilling, a recast layer of material indicated generally as 146 is formed on the surface of hole 122. During the process of cleaning a portion of a component, for example, TBC 126, liners 22, 26 are typically subjected to dry or wet grit blasting with an abrasive media such as alumina particles. In wet grit blasting, the abrasive media is suspended in a liquid, typically water, and then sprayed at high velocity to remove TBC 126. As a result, and as shown in FIG. 7, recast layer 146 is typically partially or completely removed, thus increasing or enlarging the effective diameter of hole 122 from that indicated by double headed arrow 150 (see FIG. 6), to that indicated by double headed arrow 154 (see FIG. 7). By using an embodiment of the method of this invention previously described with respect to FIG. 5, diameter 154 of these enlarged holes 122 can be reduced to adjust and control airflow therethrough.

An embodiment of the method of this invention for adjusting and controlling the airflow through holes 122, and thus adjusting and controlling the airflow through liners 22 and 26, includes the steps of: (a) initially determining the amount of airflow through holes 122 prior to applying coating 130; (b) applying coating 130 to the cold side 74, 82 of liner 22 and/or 26, as previously described; (c) determining the amount of airflow through holes 122 after coating 130 has been applied; and (d) repeating steps (b) and (c) as needed until the desired degree of airflow is achieved. An embodiment of such a method can be carried out by appropriate modification of the technique disclosed in commonly assigned U.S. Pat. No. 6,408,610 (Caldwell et al), issued Jun. 28, 2002, which is incorporated by reference. The Caldwell et al method, as modified for use in the embodiment of the method of this invention, includes the steps of: (1) developing a predetermined pressure drop across holes 122 prior to applying coating 130; (2) calculating the airflow through holes 122 resulting from the predetermined pressure; (3) depositing a selected thickness of coating 130 based on the measured airflow through holes 122 so that airflow through holes 122 after depositing the coating 130 is within a preselected range of airflows. The minimum airflow of the preselected range of desired airflows is typically selected to provide sufficient airflow through holes 122 to maintain liners 22 and 26 below a selected maximum temperature during engine operation. This maximum temperature is calculated to provide an environment in which liners 22 and 26 life requirements will be met. The maximum airflow of the range is typically selected to ensure sufficient airflow through other components within the gas turbine engine to maintain the other components below maximum temperatures at which their respective life requirements are met. Local airflow changes could also cause a detrimental effect on component life as a result of excessive gradient temperatures and can also be corrected according to this embodiment of this invention.

In using the Caldwell et al method, as modified for use in the method of this invention (see FIG. 3 of Caldwell et al patent), the turbine component, such as combustor liner 22, 26 is checked by a pressure flow stand, before and after coating 130 is deposited on cold side 74, 82. After pressurization, and because of the difference in pressure between the upstream and downstream ends of the pressure flow stand, a pressure drop develops across holes 122 of the combustor liner 22, 26. Because the upstream and downstream pressures are known, airflow through holes 122 can be calculated. For a turbine component or portion thereof, this airflow is compared to a preselected range of desired airflows. If the airflow is within the preselected range of desired airflows and the combustor liner 22, 26 otherwise meets desired component specifications or limits, it is then ready (i.e., acceptable) for use.

If, however, the airflow is above the preselected range of desired airflows, additional layers of coating 130 are then deposited on the combustor liner 22, 26. The coated combustor liner 22, 26 is again measured for airflow through holes 122 as before and the measured airflow is again compared to the preselected range. In one embodiment of this alternative method, these steps can be repeated until the measured airflow is within the preselected range of desired airflows. Typically, the step of depositing coating 130 need be repeated no more than once in this alternative method.

The minimum airflow of the preselected range of desired airflows is selected to provide sufficient airflow through holes 122 to maintain the turbine component (e.g., combustor 10) below a selected maximum temperature during engine operation. This maximum temperature is calculated to provide an environment in which component life requirements will be met. The maximum airflow of the range is selected to ensure that there is sufficient airflow through other components of the gas turbine engine and that the other components are maintained below maximum temperatures at which their respective life requirements are met.

While specific embodiments of this invention have been described, it will be apparent to those skilled in the art that various modifications thereto can be made without departing from the spirit and scope of this invention as defined in the appended claims.

What is claimed is:

1. A method for adjusting airflow in a turbine component having a plurality of airflow holes, a cold surface, and a hot surface, wherein the airflow holes extend from the cold surface to the hot surface, the method comprising the step of depositing an overlay metallic coating on the cold surface of the turbine component in a manner such that at least some of the airflow holes are partially filled with the overlay metallic coating such that the volume of the partially filled airflow holes is changed so as to adjust the airflow through the turbine component.

2. The method of claim 1 wherein the overlay metallic coating is deposited to a thickness of from about 1 to about 10 mils.

3. The method of claim 2 wherein the overlay metallic coating is deposited to a thickness of from about 2 to about 7 mils.

4. The method of claim 1 wherein the overlay metallic coating is deposited by plasma spray.

5. The method of claim 1 wherein the overlay metallic coating comprises a MCrAlY coating wherein M is a metal selected from the group consisting of iron, nickel, platinum, cobalt, and alloys thereof.

6. The method of claim 5 wherein the overlay metallic coating is a NiCrAlY coating.

7. The method of claim 1 wherein the overlay metallic coating is deposited on the cold surface of an OEM turbine component having at least some larger than desired airflow holes.

8. The method of claim 1 wherein the overlay metallic coating is deposited on the cold surface of a turbine component having at least some airflow holes that have become enlarged after original manufacture of the turbine component.

9. A turbine engine component having a plurality of airflow holes, a cold surface, a hot surface and wherein the airflow holes extend from the cold surface to the hot surface, at least some of the airflow holes being partially filled with an overlay metallic coating deposited on the cold surface to change the volume thereof so as to adjust the airflow through the turbine component.

10. The turbine component of claim 9 which is a combustor liner.

11. The combustor liner of claim 10 wherein the cold surface is an air supply side, wherein the hot surface is a combustion side and wherein the airflow holes extend from the air supply side to the combustion side, and wherein the overlay metallic coating is on the air supply side.

12. The combustor liner of claim 10 wherein the overlay metallic coating has a thickness of from about 1 to about 10 mils.

13. The combustor liner of claim 12 wherein the overlay metallic coating has a thickness of from about 2 to about 7 mils.

14. The combustor liner of claim 12 wherein the overlay metallic coating comprises a MCrAlY coating wherein M is a metal selected from the group consisting of iron, nickel, platinum, cobalt, and alloys thereof.

15. The combustor liner of claim 14 wherein the overlay metallic coating is a NiCrAlY coating.

16. The turbine component of claim 9 wherein the overlay metallic coating is deposited after at least some airflow holes have become enlarged after original manufacture of the turbine component.

17. A method for adjusting and controlling the airflow in a combustor liner having an air supply side and a combustion side and a plurality of airflow holes extending from the air supply side to the combustion side, the method comprising the steps of:
  (a) initially determining the amount of airflow through the airflow holes prior to applying an overlay metallic coating;
  (b) applying an overlay metallic coating on the air supply side by thermal spray deposition in a manner such that at least some of the airflow holes are partially filled such that the volume of the partially filled airflow holes is changed so as to adjust the airflow through the airflow holes;
  (c) determining the amount of airflow through the airflow holes after the coating has been applied; and
  (d) repeating steps (b) and (c) as needed until the desired degree of airflow through the airflow holes is achieved.

18. The method of claim 17 wherein the preselected range of desired airflows includes a minimum airflow selected to provide sufficient airflow through the plurality of airflow holes to maintain the component below a maximum temperature at which component life requirements are met.

19. The method of claim 17 wherein the preselected range of desired airflows includes a maximum airflow selected to ensure sufficient airflow through other components of the gas turbine engine to maintain the other components below maximum temperatures at which their respective life requirements are met.

20. The method of claim 17 wherein step (d) is carried out one time only.

21. The method of claim 17 wherein the overlay metallic coating comprises a MCrAlY coating wherein M is a metal selected from the group consisting of iron, nickel, platinum, cobalt, and alloys thereof.

22. The method of claim 21 wherein the overlay metallic coating is a NiCrAlY coating.

23. A method for adjusting airflow in a turbine component having a plurality of airflow holes, the method comprising the step step of depositing an overlay metallic coating by themal spray deposition on a surface of the turbine component in a manner such that at least some of the airflow holes are partially filled with the overlay metallic coating such that the volume of the partially filled airflow holes is charged so as to adjust the airflow through the turbine component.

24. The method of claim 23 wherein the turbine component is a combustor liner.

25. The method of claim 24 wherein the combustor liner has an air supply side, a combustion side and wherein the airflow holes extend from the air supply side to the combustion side, and wherein the overlay metallic coating is deposited onto the air supply side.

26. The method of claim 25 wherein the airflow holes comprise a plurality of rows of transpiration cooling holes having a diameter in the range of from about 0.01 to about 0.05 inches.

27. The method of claim 25 wherein the transpiration holes have a diameter in the range of from about 0.02 to about 0.03 inches, and have a spacing therebetween of from about 3 to about 10 hole diameters.

28. The method of claim 27 wherein the transpiration holes extend at a slanted angle from the air supply side to the combustion side.

29. The method of claim 28 wherein the overlay metallic coating is sprayed on the air supply side at an angle that is the same or similar to the slanted angle.

30. The method of claim 28 wherein the overlay metallic coating is sprayed on the air supply at an angle that is different from that of the slanted angle.

31. A turbine engine component comprising a combustor liner having a plurality of airflow holes, an air supply side, a combustion side, and a plurality of rows of transpiration cooling holes having a diameter in the range of from about 0.01 to about 0.05 inches, each of the transpiration cooling holes extending from the air supply side to the combustion side, and an overlay metallic coating deposited on the air supply side, wherein at least some of the transpiration cooling holes are partially filled with the overlay metallic coating to change the volume thereof so as to adjust the airflow through the turbine component.

32. The combustor line of claim 31 wherein the transpiration holes have a diameter in the range of from about 0.02 to about 0.03 inches, and have a spacing therebetween of from about 3 to about 10 hole diameters.

33. The combustor liner of claim 32 wherein the transpiration holes extend at a slanted angle from the air supply side to the combustion side.

* * * * *